United States Patent [19]

Cutburth

[11] Patent Number: 4,755,025
[45] Date of Patent: Jul. 5, 1988

[54] APPARATUS AND METHOD OF PRELOADING VIBRATION-DAMPING BELLOWS

[75] Inventor: Ronald W. Cutburth, Tracy, Calif.

[73] Assignee: The United States Department of Energy, Washington, D.C.

[21] Appl. No.: 911,846

[22] Filed: Sep. 26, 1986

[51] Int. Cl.⁴ ............................................. G02B 7/22
[52] U.S. Cl. .................................. 350/321; 350/500;
       92/41; 222/206; 248/575
[58] Field of Search ............... 350/321, 319, 609, 500;
       92/35, 37, 41, 43; 222/206, 207, 209; 248/575

[56] References Cited

U.S. PATENT DOCUMENTS

| | | | |
|---|---|---|---|
| 3,256,770 | 6/1966 | Wicker | 350/321 |
| 3,420,147 | 1/1969 | Beach | 92/37 |
| 4,618,215 | 10/1986 | Keller et al. | 350/319 |

Primary Examiner—John K. Corbin
Assistant Examiner—Loha Ben
Attorney, Agent, or Firm—P. Martin Simpson, Jr.; L. E. Carnahan; Judson R. Hightower

[57] ABSTRACT

An improved vibration damping bellows mount or interconnection is disclosed. In one aspect, the bellows is compressively prestressed along its length to offset vacuum-generated tensile loads and thereby improve vibration damping characteristics.

14 Claims, 2 Drawing Sheets

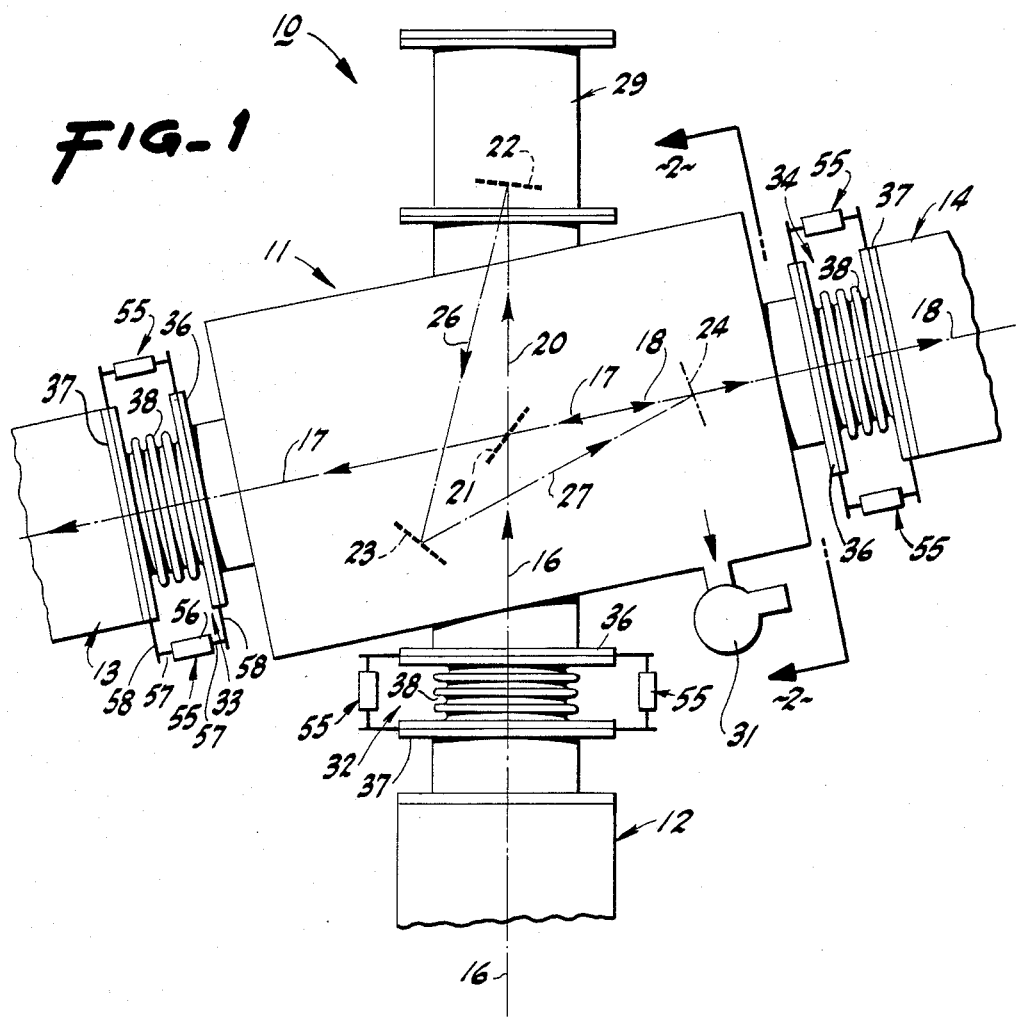

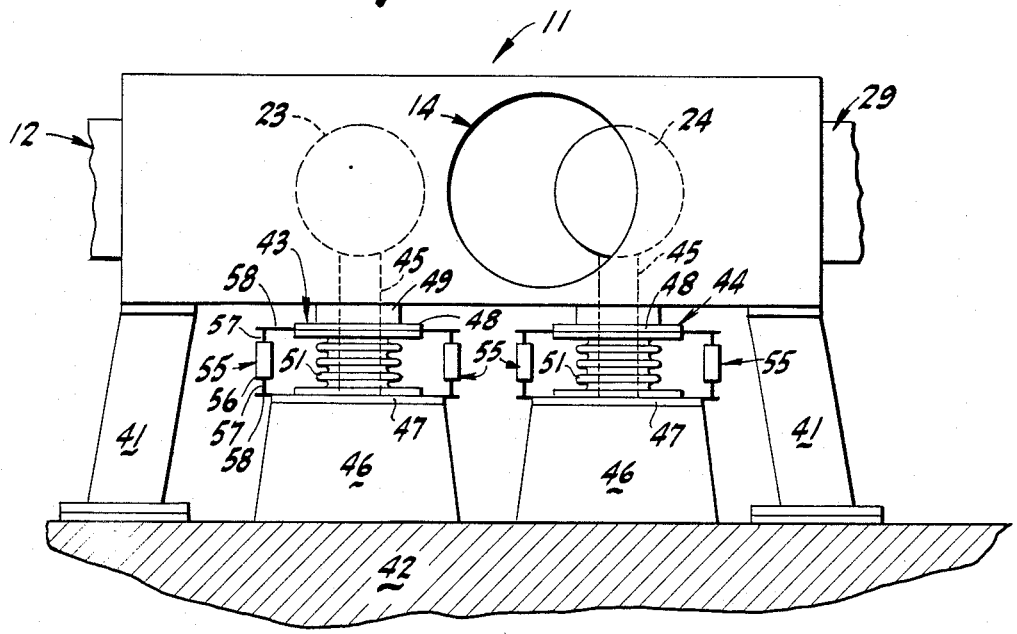

APPARATUS AND METHOD OF PRELOADING VIBRATION-DAMPING BELLOWS

FIELD OF THE INVENTION

The United States government has rights in this invention pursuant to Contract No. W-7405-ENG-48 between the United States Department of Energy and the University of California for operation under Lawrence Livermore National Laboratory.

BACKGROUND OF THE INVENTION

The present invention relates to bellows which are used for vibration isolation. In particular, the present invention relates to bellows which are used to provide vibration-damped mounting/interconnection of in-vacuum laser beam propagation systems.

Frequently, in high power, long beam path laser systems such as laser isotope separation systems, the laser beams must be routed in a vacuum. The vibrations generated by the large vacuum pumps used in such systems can destroy beam alignment. Bellows have been used in an attempt to provide vibration isolation mounting and/or interconnection of sensitive system components. For example, the mirrors and lenses used for controlling the path and focus of laser beams have been individually or collectively mounted via bellows to a supporting base or fixture. Also, bellows have been used to mount or interconnect (i.e., to isolate) laser beam light tubes.

SUMMARY OF THE INVENTION

It has been discovered that the internal vacuum conditions which are frequently applied to such systems, including to the bellows, decrease the vibration damping performance of the bellows. In fact, the vacuum may substantially eliminate the vibration isolation. Normally, the vacuum damping or vacuum isolation characteristics of bellows can be increased by increasing the bellows length. Unfortunately, the undesirable vacuum loading effect is also proportional to length. That is, the vacuum-generated load on the bellows also increases with increased bellows length. As a consequence of this increased vacuum loading, increasing the size of the bellows may be ineffective in achieving the desired vibration isolation.

In view of the above discussion, it is a primary object of the present invention to provide a simple, compact bellows mount which substantially eliminates vacuum suppression of vibration damping.

In a presently preferred embodiment, my invention relates to a bellows system comprising a compressible (and expandible) vacuum bellows and means for pre-stressing the bellows to offset vacuum loading. The vacuum bellows system can be used for mounting and/or interconnection.

In another aspect, my invention relates to a vacuum optical system comprising at least one light tube for beam propagation and an enclosed optical control unit which contains beam control components such as lenses and mirrors and which communicates with the light tube for controlling the path of the beam(s) within the light tube; at least one bellows supporting a beam control component or a light tube; and means for applying a selected force along the bellows to offset vacuum-induced loading.

Additional objects, advantages and novel features of the present invention will be set forth in the description which follows and in part become apparent to those skilled in the ar upon examination of the following or may be learned by practice of the invention. The objects and advantages of the invention may be realized and attained by means of the instrumentalities and combinations which are pointed out in the appended claims.

BRIEF DESCRIPTION OF THE DRAWINGS

The accompanying drawings which are incorporated in and form a part of this specification illustrate and embodiment of the invention and, together with the description, serve to explain the principles of the invention.

FIG. 1 is a schematized top plan view of an exemplary laser propagation system which incorporates vibration damping bellows embodying the principles of my present invention.

FIG. 2 is an end view of the beam control unit shown in FIG. 1.

FIG. 3 is a vector diagram of vacuum-generated forces occurring in the three light tubes shown in FIG. 1.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

FIG. 1 is a schematic top plan view of a section 10 of a vacuum laser propagation system which incorporates vibration damping bellows. For example, the exemplary section 10 may be part of a laser isotope separation system. The system 10 includes a beam path switching unit 11 which is used to route an incident optical beam such as a laser along one of several paths. That is, the exemplary beam switching unit 11 is joined to three vacuum light tubes 12, 13 and 14 used for transmitting laser beams along respective optical paths 16, 17 and 18. (Reference numerals 16, 17 and 18 are used here to designate the individual laser beams as well as the associated laser beam path.) Incident laser beam 16 enters the beam switching unit 11 and, depending upon which one of movable or removable mirrors 21 and 24 is present, is directed along one of the two output paths 17 and 18 to a remote location (not shown). Specifically, when switching mirror 21 is not present and mirror 24 is in place, the input beam travels along path 20 to the mirror 22 and is deflected by mirrors 22 and 23 along paths 26 and 27 to mirror 24. Mirror 22 is shown mounted within stub light tube 29 to provide the necessary path length. The mirror 24 directs the beam leftwardly along the path 17 through the light tube 13 away from the beam switching unit 11. Alternatively, when mirror 21 is in position and mirror 24 is removed, the incident beam 16 is deflected by mirror 21 rightwardly along path 18 through light tube 14 away from the switching unit 11.

Vacuum can be applied to the system by one or more vacuum pump systems 31 which are connected to the unit 11 and/or to other components of the system.

Laser system 10 includes three bellows units 32, 33 and 34 mounted in the light tubes 12, 13 and 14 adjacent the beam switching unit 11. Each bellows unit 32, 33 and 343 comprises a pair of sealing end flanges 36 and 37 and a bellows 38, which preferably is a diaphragm bellows. As mentioned, the bellows units 32, 33 and 34 are for the purpose of isolating the beam switching unit 11 from vibrations occurring in the light tubes 12, 13 and 14, and vice versa.

As depicted in the FIG. 2 end view, the beam switching unit 11 is mounted via legs 41—41 to the floor or ground 42. The mirrors such as 23 and 24 are supported on posts 45—45 which are mounted on bases 46—46. Bellows units—two such units 43 and 44 are shown—are mounted between the bases 46—46 and the switching unit 11 for isolating the associated mirrors such as 23 and 24 from vibrations. Alternatively, the mirrors 23, 24, etc., can be mounted on a table (not shown) which is supported by one or more bases 46 and associated bellows units. Each vacuum bellows unit 43 and 44 is constructed similarly to the vacuum bellows units 32, 33 and 34. That is, each unit 43 and 44 comprises (a) flanges 47 and 48 which are sealed, respectively, to base 46 and stub connection 49 of the beam switching unit 11, and (b) bellows 51. Thus, each bellows unit 43 and 44 is connected by its associated stub conduit 49 to the interior of the beam switching chamber 11 and, like bellows units 32, 33 and 34, is maintained at the internal vacuum level of the switching chamber 11.

For an exemplary bellows 4 in. long by 18 in. I.D. (effective area≈290 in.$^2$) a typical pressure difference of about 14.7 psi applies a load of approximately 4,000 pounds on each bellows unit 32, 33, 34 and 43 and 44. Please note, the vacuum load is greatly increased because of the convoluted surface area of the bellows. FIG. 3 is a diagram of the tensile forces which are applied to the bellows 32, 33 and 34. In FIG. 3, the vacuum loading forces along light tube bellows 32, 33 and 34 are indicated by vectors designated, respectively, 132, 133 and 134. This compressive loading tends to collapse each bellows 43 and 44 as well as 32, 33 and 34 along its length (that is, along the longitudinal axes such as 16, 17 an 18, FIG. 1) and to thereby negate the vacuum vibration damping capability of the bellows. However, this vacuum loading is substantially eliminated by incorporating prestressing means into each bellows unit for applying a compressive force between the end flanges 36 and 37 (FIG. 1) or 47 and 48 (FIG. 2). In reaction to this selected compressive prestressing, the bellows material exerts an equal and opposite force which counteracts the vacuum load during vacuum operation. If the prestress force approximates the magnitude of the vacuum load, the reactive bellows force will substantially cancel the vacuum loading. In addition to restoring the vacuum isolation, this eliminates the tendency of the vacuum load to destroy (pull apart) the bellows flange seals.

Referring to FIGS. 1 and 2, typically, the compression means comprises a plurality of at least two force-applying units 55 which are mounted to and evenly spaced about the periphery of the associated flanges 36 and 37 or 47 and 48 for applying balanced force across each bellows units 32, 33, 34, 43 and 44. In a presently preferred embodiment, each force transmitting unit 55 comprises a turnbuckle 56 which is rotatably mounted on two threaded rods 57—57. Each rod is joined to a respective bracket 58. The two brackets in turn are affixed to the opposite bellows flanges 36 and 37 or 47 and 48. The cooperating turnbuckle units 55 are used to compress each bellows, preferably, with a force which approximates the vacuum-induced loading force (here, approximately 4,000 pounds). Consequently, each of the bellows units 32, 33, 34, 43 and 44 reactively negates the vacuum load and, thus, provides the intended vibration damping. In short, by prestressing each bellows unit with a selected compressive force which approximates the magnitude of the vacuum-generated compressive force, the adverse effect of this vacuum load on vibration isolation is substantially eliminated. The bellows units thus provide a substantially increased vibration damping which closely approximates vacuum load-free vibration damping.

The foregoing description of the preferred embodiment of the invention has been presented for purposes of illustration and description. It is not intended to be exhaustive or to limit the invention to the precise form disclosed and many modifications and variations are possible in light of the above teachings. For example, other embodiments of force-transmitting units in addition to the described turnbuckle units 55 will be implemented by those of usual skill in the art. As another example, the invention is equally applicable to bellows that are operated in external ambient environments of relatively lower pressures than those exist within the bellows. For example, an atmospheric pressure bellows might be operated within a vacuum. In such an application, the bellows unit would be subjected to tensile, expansive loading and the turnbuckle or other force transmitting unit would be used to apply tensile to return to the vibration isolation force intended. The preferred embodiment was chosen and described in order to best explain the principles of the invention and its practical application to thereby enable others skilled in the art to best utilize the invention and various embodiments and with various modifications as are suited to the particular use contemplated. It is intended that the scope of the invention be defined only by the claims appended hereto.

What is claimed is:

1. A load-equalized bellows system, comprising:
a variable length bellows of selected initial length for damping vibrations experienced thereby, said bellows being adapted for maintaining an internal pressure within said bellows different from the pressure external to said bellows; and
means for applying to said bellows along the length thereof a force of selected direction for altering the initial length of said bellows a selected amount to offset the effect on vibration of loads applied to said bellows by said pressure difference.

2. The system of claim 1, further comprising first and second vacuum chambers interconnected by said bellows for isolating vibrations in one chamber from the other.

3. The system of claim 2, said bellows being adapted for being maintained at an internal pressure lower than the pressure external to said bellows; and said force applying means being adapted for applying a compressive force along the length of said bellows to offset loads generated by said pressure difference.

4. The system of claim 2, said bellows being adapted for being maintained at an internal pressure higher than the pressure external to said bellows; and said force applying means being adapted for applying a tensile force along the length of said bellows to offset loads generated by said pressure difference.

5. The system of claim 1, said bellows being adapted for being maintained at an internal pressure lower than the pressure external to said bellows; and said force applying means being adapted for applying a compressive force along the length of said bellows to offset loads generated by said pressure difference.

6. The system of claim 1, said bellows being adapted for being maintained at an internal pressure higher than the pressure external to said bellows; and said force applying means being adapted for applying a tensile force along the length of said bellows to offset loads generated by said pressure difference.

7. A vibration isolated mounting system for a workpiece, comprising:
a chamber mounted by a first external base means to a floor or other support;
a workpiece;
a second external base means mounted to the floor or other support, and including support means extending into said chamber mounting said workpiece therein;
a variable length vibration damping bellows mounted between said second base means and said chamber;
said bellows and said chamber being adapted for maintaining internal pressure therein different from the pressure of the surrounding ambient; and
means for applying to said bellows along the length thereof a force of selected direction for offsetting loads generated by said pressure difference.

8. The system of claim 7, said bellows being adapted for being maintained at an internal pressure lower than the pressure external to said bellows; and said force applying means being adapted for applying a compressive force along the length of said bellows to offset loads generated by said pressure difference.

9. The system of claim 7, said bellows being adapted for being maintained at an internal pressure higher than the pressure external to said bellows; and said force applying means being adapted for applying a tensile force along the length of said bellows to offset loads generated by said pressure difference.

10. A vibration-isolated system comprising:
(a) a multiplicity of vacuum chambers;
(b) means for developing a vacuum in the interior of said chambers;
(c) selected pairs of said chambers being interconnected by compressible bellows, each bellows of each pair of chambers communicating with the interior of said pair of chambers for providing vibration isolation between said pair of chambers, said bellows further including means for applying a selected compressive force along the length of said bellows to offset vacuum-generated loads.

11. A vibration-isolated optical system comprising:
(a) a generally enclosed optical transmission system including at least first and second light tubes and an enclosed control chamber connected to said light tubes;
(b) optical beam control means within said chamber for controlling the path of an optical beam within said light tubes;
(c) support means separate from said chamber and extending into said chamber mounting said control means therein;
(d) first and second vibration isolation bellows respectively connecting said first and second light tubes to said chamber, said bellows each having an axis generally parallel to each light tube;
(e) third vibration isolation bellows mounted between said support means and said chamber;
(f) means for applying a vacuum to said chamber, said first, second and third bellows and said light tubes; and
(g) means for applying a selected compressive force along the length of each of said first, second and third bellows for offsetting vacuum-generated loads in said bellows.

12. The system of claim 11 where each bellows comprises a diaphragm bellows.

13. A method of modifying vibration damping characteristics of a variable length vacuum bellows having a selected initial length, comprising: applying a compressive force along the length of the bellows to compress the length of the bellows by a selected dimension; and maintaining said compressed length while pulling a vacuum within said bellows, to offset vacuum-generated loads thereon and thereby enhance vibration damping and vacuum sealing.

14. A method of modifying vibration damping characteristics of a variable length bellows adapted for being maintained at a pressure different from the pressure external to said bellows, said bellows having a given initial length, comprising: applying a tensile force along the length of the bellows to increase the length of the bellows by a selected dimension; and maintaining said increased length while applying said pressure difference, to offset loads thereon generated by said pressure difference.

* * * * *